Jan. 2, 1934.                C. L. EKSERGIAN                1,942,091

MANUFACTURE OF WIRE WHEELS

Filed July 30, 1932

INVENTORS.
CAROLUS L. EKSERGIAN
BY John P. Fairbox
ATTORNEY.

Patented Jan. 2, 1934

1,942,091

UNITED STATES PATENT OFFICE 1,942,091

MANUFACTURE OF WIRE WHEELS

Carolus L. Eksergian, Detroit, Mich., assignor to Budd Wheel Company, Philadelphia, Pa., a corporation of Pennsylvania Application July 30, 1932. Serial No. 627,052

6 Claims. (Cl. 29—159.02)

This invention relates to the art of vehicle wheels and particularly to methods of manufacturing wire wheels of the tension type, and relates particularly to the tensioning of such wheels.

The prime object of the invention is to provide a method of tensioning wheels of this type in a manner characterized by the utmost simplicity and effectiveness.

A secondary object is to provide means for holding one of the wheel parts flexed during securing or initial tensioning of the spokes in order to obtain the required tension in the spokes upon the release of the flexed member. Such tensioning, by flexure of the hub or rim member during the securement of the spokes has heretofore been proposed, but this invention comprises an improvement over the devices and methods previously advanced.

Broadly, the objects of this invention have been achieved by providing means for flexing the axial spoke securing zone of one of the concentric wheel members between which the spokes extend, by applying axial pressure thereto. More specifically the drop center spoke securing portion of the rim is radially contracted by applying axial pressure to the rim flanges.

Other objects and advantages of the invention and the means by which they have been carried out will be apparent after a perusal of the subjoined specification in light of the attached drawing, in which, Fig. 1 is an illustration of the principle underlying the method of rim contraction.

Figure 1:
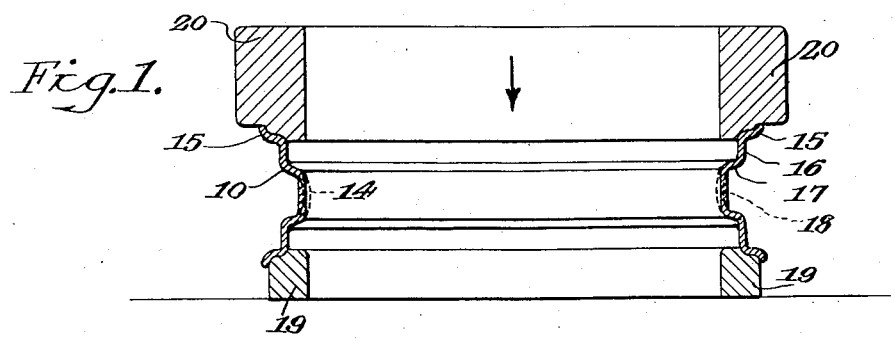
Figure 2:
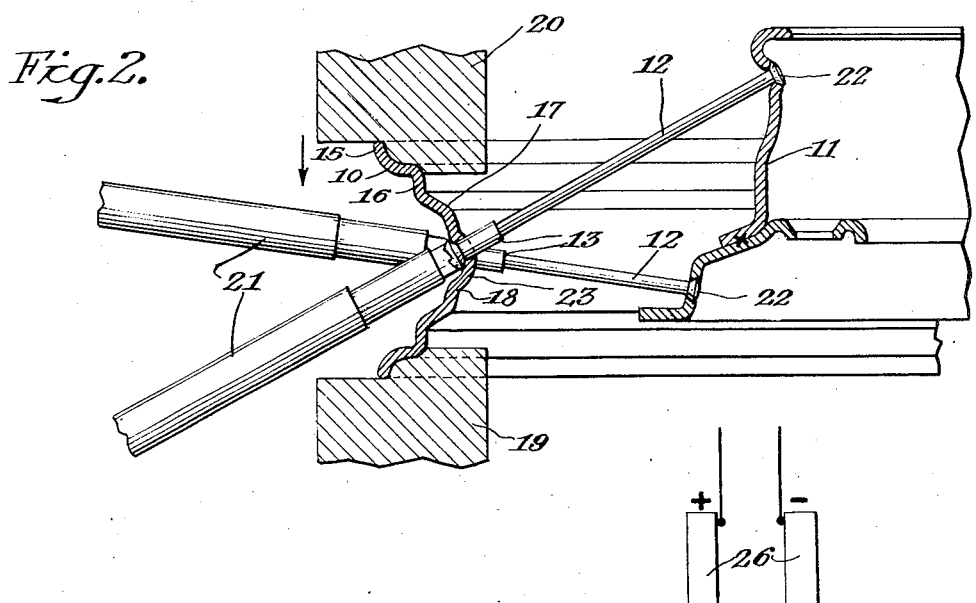
Fig. 2 is an enlarged view showing the mechanism used for assembling and tensioning a wire wheel of the nipple type.
Figure 3:
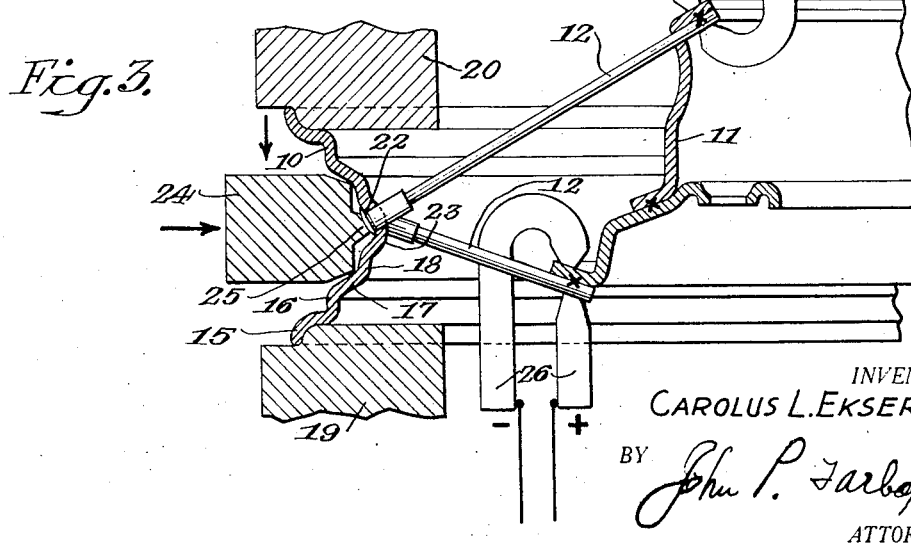
Fig. 3 is essentially similar to Fig. 2 but shows the apparatus used in the assembly of wheels of the welded type.

Referring to the drawing by reference characters, the wheel which the invention is designed to produce consists of a rim member 10 and a hub member 11, interconnected by a plurality of wire spokes 12, which in Fig. 2, are of the nipple type, and in Fig. 3 are of the edge welded type. In the instance of the nipple type wheel, the spokes are headed at the hub shell ends and seated in suitable hemispherical apertures in the hub shell. The outer ends of spokes 12 are threaded to receive complementally threaded nipples 13. In the instance of the welded wheel shown in Fig. 3, the spokes are headed at the outer ends, and seated in suitable hemispherical depressions in the drop center portion 14 of rim 10, the inner ends of spokes 12 being aligned or edge welded to suitable flanges in the hub 11.

The invention is particularly applicable to a rim of the drop center type, and has been illustrated in connection with such a rim, although it has application to other types as well. This rim consists of a pair of tire bead retaining flanges 15 merging into the bead seats 16, which in turn, merge into the drop center side portions 17 interconnected by a drop center base portion 18.

The object of the invention is primarily to shorten the distance between the hub 11 and rim 10 temporarily during the tensioning or securement of the spokes, and thereafter to allow the distance to become normal by virtue of the natural tendency of the deformed member to resume its normal shape, thus effecting equal tension in all of the spokes. It has been found most satisfactory to effect a temporary distortion of the rim member 10, particularly the drop center portion 14 thereof, by supporting the rim on one of its tire retaining flanges 15 and applying pressure on the other of said tire retaining flanges 15 axially of the rim. This causes the drop center base portion 18 to flex radially inwardly, shortening measurably the distance between the rim and the hub.

This axial flexing has been accomplished by a pair of ring dies, the stationary die being indicated by numeral 19, and the movable die being indicated by numeral 20. In Fig. 2 there is shown these dies considerably enlarged, in connection with the nipple type wire wheel. In accordance with the practice of the invention, the hub and rim may be concentrically located by means of any suitable jigging mechanism, which it is unnecessary to describe. After the concentric location of these members, the spokes 12 are inserted outwardly through the holes in the hub and rim and nipples 13 are threaded on to the ends thereof. After the insertion of these spokes, dies 19 and 20 are applied to the axial edges of the rim 10 and suitable pressure is applied to flex the drop center portion 14 radially inwardly, to a degree not exceeding the elastic limit of this portion. While the rim is so flexed, suitable tools 21 containing engaging portions complemental to those on the ends of the nipples 13 are moved into engagement with the nipples, and impart rotation thereto sufficient to completely tighten the nipples on the threaded ends of spokes 12. After the tightening of the spokes, the pressure of dies 19 and 20 is relieved, the drop center portion of the rim tending to assume its normal position by expanding radially outwardly and thus putting an even degree of tension in all of the spokes 12.

In the form of the invention illustrated in Fig. 3, the spokes are assembled through the rim radially inwardly to the hub shell after these members are properly jigged and concentrically located. In order that the spoke heads 22 may properly seat in their respective hemispherical depressions 23, there is provided a series of radially movable dies 24, having suitable projections 25 on their inner faces, which projections are adapted to press firmly against the spoke heads 22 in order to seat them firmly. With the spoke heads so seated, and the dies 19 and 20 pressing axially on the rim 10, the inner ends of the spokes are welded to the various hub flanges by means of suitable electrodes 26 illustrated diagrammatically. The subsequent release of dies 19 and 20 and the radial holding dies 24 allows the drop center portion 14 of rim 10 to assume its natural position, thus placing all of the spokes 12 under an even degree of tension.

The axial and radial flexure of the rim and the manner in which it is produced, constitute highly important features of the invention, as the maximum amount of circumferential distortion of an ordinary vehicle wheel rim within its elastic limit is not great, and it is accordingly desirable to take advantage of every possible mechanical factor effecting spoke tension by a flexure of this kind. It is obvious that the objects of the invention have been achieved in every degree, inasmuch as there is provided an extremely simple method for flexing the rim during the tension of the spokes.

While illustrated the invention in connection with drop center rims, it should be borne in mind that the invention applies equally well to other types of rims in which the spokes are attached to regions approximating the axial center of the rim.

Modifications will be obvious to those skilled in the art, and therefore the invention is not to be limited by the circumstantial terminology of the specification, but rather solely by the scope of the appended claims which should be read with a breadth of understanding commensurate with the spirit of the invention.

What I claim is:

1. The method of forming a vehicle wheel consisting of hub and rim members interconnected by spokes, which comprises flexing one of said members within its elastic limit by pressure applied axially of said member, securing the spokes in their final condition with respect to said members while the member is flexed, and thereafter releasing the pressure to allow the natural resilience of the flexed member to effect the desired tension by reason of its tendency to resume its normal shape.

2. The method of forming a vehicle wheel consisting of hub and rim members interconnected by spokes, which comprises flexing said rim member within its elastic limit by pressure applied axially of said rim, securing the spokes in their final condition with respect to said members while the rim member is flexed, and thereafter releasing the pressure to allow the natural resilience of the flexed rim member to effect the desired tension by reason of its tendency to resume its normal shape.

3. The method of forming a vehicle wheel consisting of hub and rim members interconnected by spokes, which comprises flexing said rim member axially and circumferentially within its elastic limit by pressure applied axially of said rim, securing the spokes in their final condition with respect to said members while the rim member is flexed, and thereafter releasing the pressure to allow the natural resilience of the flexed rim member to effect the desired tension by reason of its tendency to resume its normal shape.

4. The method of forming a vehicle wheel consisting of hub and rim members interconnected by spokes, which comprises flexing said rim member within its elastic limit by pressure applied axially of said rim, pressing radially on the heads of said spokes to seat them firmly in their respective seats, securing the opposite ends of said spokes in their final condition with respect to said members while the rim member is flexed, and thereafter releasing the pressure to allow the natural resilience of the flexed member to effect the desired tension by reason of its tendency to resume its normal shape.

5. The method of forming a vehicle wheel consisting of hub and rim members interconnected by spokes, which comprises flexing said rim member within its elastic limit by pressure applied axially of said rim, tightening up nipples on the threaded ends of said spokes while the rim member is flexed, and thereafter releasing the pressure to allow the natural resilience of the flexed member to effect the desired tension by reason of its tendency to resume its normal shape.

6. The method of forming a vehicle wheel consisting of hub and rim members interconnected by spokes, which comprises flexing said rim member within its elastic limit by pressure applied axially of said rim, welding the ends of said spokes to one of said members, while the rim member is flexed, and thereafter releasing the pressure to allow the natural resilience of the flexed member to effect the desired tension by reason of its tendency to resume its normal shape.

CAROLUS L. EKSERGIAN.